Figure 1:
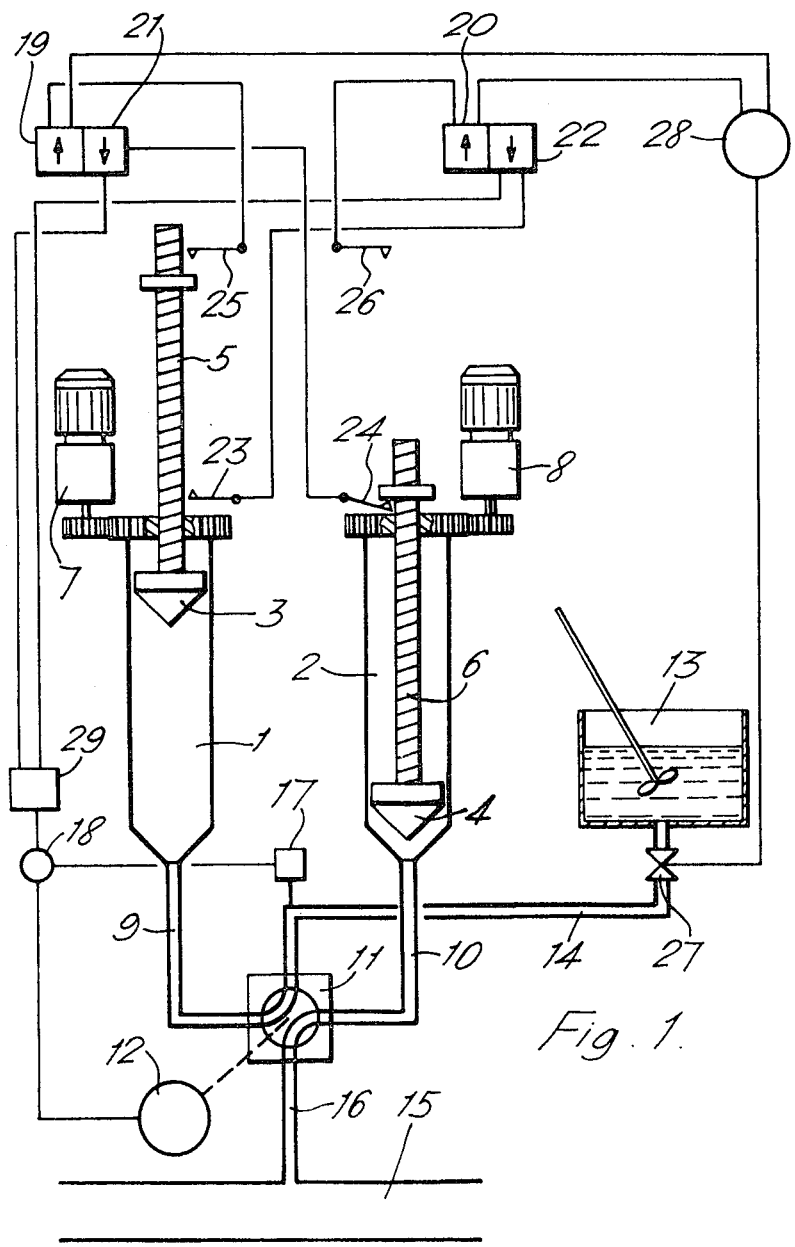

United States Patent

[11] 3,597,113

[72] Inventors Georges Dumoulin
 Villefranche;
 Lucien Manjot, Lyon, both of, France
[21] Appl. No. 793,278
[22] Filed Jan. 23, 1969
[45] Patented Aug. 3, 1971
[73] Assignee Societe Rhodiaceta
 Paris, France
[32] Priority Jan. 26, 1968
[33] France
[31] 137,629

[54] PROCESS AND DEVICE FOR THE AUTOMATIC CONTINUOUS INJECTION OF AN ADJUVANT INTO A FLUID
 15 Claims, 2 Drawing Figs.
[52] U.S. Cl. .................................................... 417/53, 417/339
[51] Int. Cl. ..................................................... F04b 17/00
[50] Field of Search ........................................... 103/49; 230/53; 417/53, 339

[56] References Cited
UNITED STATES PATENTS
| | | | |
|---|---|---|---|
| 2,890,658 | 6/1959 | Hjarpe .......................... | 103/49 |
| 2,996,014 | 8/1961 | Lee ............................... | 103/49 |
| 3,183,840 | 5/1965 | Conover ....................... | 103/49 |

Primary Examiner—Robert M. Walker
Attorney—Cushman, Darby & Cushman

ABSTRACT: A process of and a device for the automatic continuous injection of an adjuvant into a fluid in which the adjuvant is injected into the fluid by means of a plurality of syringes of which at any one time at least one is feeding adjuvant to the fluid, the individual syringes being operated in alternating filling and discharge phases, and the pressure in each syringe at the end of the filling phase and before the discharge phase begins being equal to or greater than the pressure existing in the zone occupied by the said fluid. In the device a motor is provided for reciprocating the syringe pistons and a commutation device is provided for communicating each syringe orifice in turn and alternately to the fluid and to a source of adjuvant.

Inventor
Georges Dumoulin
Lucien Manjot
By Cushman, Darby & Cushman
Attorneys

Patented Aug. 3, 1971

3,597,113

2 Sheets-Sheet 2

Inventors
Georges Dumoulin
Lucien Manjot
By Cushman, Danby & Cushman
Attorneys

PROCESS AND DEVICE FOR THE AUTOMATIC CONTINUOUS INJECTION OF AN ADJUVANT INTO A FLUID

This invention relates to a process and device for the automatic continuous injection of an adjuvant into a fluid.

By adjuvant is meant a product which is added to another product for the purpose of modifying its characteristics, at least temporarily. The invention is applicable to fluid products or products which are caused to act as fluids by an appropriate process such as for example fluidization and the term "fluid" as used herein is to be so understood.

It frequently proves necessary in industry to inject an adjuvant into a fluid continuously, i.e. in such a way that the rate of feed of the adjuvant does not suffer any interruption or discontinuity over prolonged periods during which the amount of adjuvant added is large relative to the dimensions of the apparatus used for the injection. This is particularly the case for a treatment of long duration carried out on a specific amount of fluid, or the treatment of a continuous flow of fluid.

In the numerous cases where the action of the adjuvant has important repercussions on the characteristics of the fluid which is to be treated, the amount of adjuvant injected per unit time and/or in total has to be very precise.

It is also desirable to render the said injection automatic, that is to say capable of taking place without manual intervention, except perhaps for the starting and stopping operations, though even these can also be controlled automatically by appropriate devices.

Attempts have been made to achieve the above objectives by using gear pumps for injecting the adjuvant. However, the internal play of these pumps makes their flow rate rather imprecise when they are used to inject liquids of low viscosity, particularly when the injection pressure is high. Furthermore, at low speed the discontinuities due to the presence of gear teeth cause variations in the flow rate which are unacceptable for certain applications, for example in the injection of pigments or matting agents into solutions or melts of polymers.

If a metering pump whose piston moves sinusoidally is used, the flow rate of the adjuvant varies, and drops significantly at the beginning and end of the travel of the piston. Apart from the fact that this variation is undesirable for precise injections, the reduction in pressure which results from it creates a risk that the fluid may penetrate into the adjuvant injection pipeline with undesirable consequences, for example blockage or premature reaction with the adjuvant.

Attempts have been made to remedy these defects by arranging several metering pumps in parallel and staggering the travels of their pistons in respect of time. It is well known that in order to achieve a continuous flow rate constant to about 15 percent it is necessary to use three pumps in which the sinusoidal travels are staggered in time by one-third of their period. However, such a relative variation in the flow rate remains unacceptable in many cases. Furthermore, the inlet and delivery valves of the metering pumps known hitherto are subject to wear, which is the greater the more abrasive the adjuvant is; this wear affects the pump flow rate, and prevents precise injection of abrasive liquids.

It has also been proposed to introduce the adjuvant into the fluid by mixing it beforehand with a gas which is inert towards the fluid, but this process results in a major consumption of gas and furthermore does not resolve the problem of the regularity and precision of the flow of adjuvant.

It is furthermore known to carry out an injection with a syringe whose piston can be driven manually or by means of an appropriate motor. The syringe, which essentially comprises a tubular chamber of variable volume terminating at one end in a so-called injection orifice, and at the other end bounded by a piston which can be moved within the tube, has the advantage of simplicity as compared to the means described above; however, the operation of such an apparatus is essentially discontinuous, and this has hitherto limited its use to injections which can be carried out in a single phase.

It is an object of the present invention to mitigate the disadvantages set out above.

In one aspect the invention consists in a process for the automatic continuous injection of an adjuvant into a fluid, which comprises injecting the adjuvant into the fluid by means of a plurality of syringes, of which at any one time at least one is feeding adjuvant to the fluid. The individual syringes being operated in alternating filling and discharge phases, and the pressure in each syringe at the end of the filling phase and before the discharge phase begins being equal to or greater than the pressure existing in the zone occupied by the said fluid.

In what follows the term "injection phase" of a syringe will denote the time during which this syringe is connected to the injection channel (i.e. the channel leading to the chamber), and the term "feed phase" the time during which it is connected to the adjuvant feed channel. The replacement of one syringe connected to the injection channel by the next syringe will be called "commutation," and the syringe which during the next commutation will replace the syringe which is in the injection phase will be described as the "waiting syringe."

Thus it is an essential feature of the invention that a pressure at least equal to and preferably close to the desired injection pressure is established in the waiting syringe. Sometimes this pressure can be established by feeding the syringes with adjuvant which is already at the pressure in question, but this is not always possible or convenient in practice. Thus the said pressure is preferably established in the waiting syringe at the end of the filling phase or after the latter and before commutation, and advantageously a short time before commutation.

This preferred embodiment is particularly valuable when the adjuvant is to be injected into the chamber at a predetermined variable flow rate, for example as a function of a variable which characterizes the course of the reaction in the chamber.

In one preferred method of operation the desired pressure is established in the waiting syringe by establishing a discharge phase which is longer than the injection phase and starts before the injection phase. Thus a part of the adjuvant contained in the syringe, is first discharged preferably back to the adjuvant feed reservoir, the resistance to such discharge being sufficient to raise the pressure in the syringe to the desired value. When this value is reached, the commutation is triggered and the injection of adjuvant continues with the fresh syringe.

This method of working is advantageously carried out with two syringes preferably working with injection phases of equal duration, the actual filling taking less time than the injection phase so as to allow time for the pressure buildup.

The commutation is carried out within a sufficiently short time not to interrupt the continuity of the injection.

In another method of operation enough of a pressure-generating fluid to establish the desired pressure is discharged into the waiting syringe a short time before commutation. This may be a proportion of the adjuvant itself, which may for example be compressed in the feed channel. Alternatively a different pressure-generating fluid may be used, for example a compressed gas, which also may be injected into the feed channel. Such a fluid must be inert or at least must not cause an objectionable reaction in the presence of the adjuvant, the fluid which is to be treated and the products which result from their combination. Of course, when the injection of adjuvant has to be very precise the amount of a different fluid which is injected must be limited so as to remain within the limits of error which are permissible for the amount of adjuvant injected.

A typical device of the invention comprises a plurality of syringes whose pistons are driven by one or more motors, via an adequate transmission mechanism which allows mechanical, electrical, pneumatic or any other suitable type of motors to be used. For this purpose there can be used any motor whose controls can be so operated as to make the device function automatically. Motors whose speed can be regulated will preferably be used, so that the rate of injection can be varied, e.g. as a function of a variable (parameter) taken as the reference.

The device for feeding adjuvant can be of any type which permits the correct supply of the syringes during their filling phase, and advantageously comprises a storage reservoir which can be connected to each of the syringes by the commutation device. The reservoir may be equipped with a device whereby it can be placed under pressure, for example by injection of an inert gas such as nitrogen.

The channel for injection to the chamber containing the fluid may, at its entry into this chamber, have any shape which is suitable for the particular injection which is to be carried out, and may comprise one or a number of suitably distributed orifices.

The commutation of the syringes is preferably carried out by means of cutoffs provided in the pipelines connected to the injection channel and to the injection orifice of each syringe, and preferably also in the connection of the syringes to the feed device. The commutation device advantageously comprises a rotating tap with several outlets. In a preferred device comprising two syringes, a rotating tap whose barrel has four tubes and whose key has four outlets communicating in pairs so as to form two separate channels each allowing one syringe to be connected to the injection channel and the other to the feed channel, constitutes a commutation unit which is simple, reliable in operation and cheap. Such a tap is particularly suitable for carrying out the invention because it prevents any overlap of the injection phases of the two syringes and as a result guarantees the succession of the said injection phases.

The pressure close to and at least equal to the injection pressure is preferably established in the syringe connected to the feed device by applying, at least after the filling phase, and before the injection phase of the said syringe, the desired pressure in the adjuvant reservoir which is suitably isolated upstream, or in the pipeline connecting the feed device to the syringe in the feed phase, this pipeline being then at least partially blocked off or subjected to a large pressure drop upstream from the point of application of the pressure, so that the pressure is transmitted downstream to the syringe.

As a means for establishing pressure in the feed pipeline there can for example be used a syringe of which the injection orifice opens out into the said pipeline, or a feed under pressure of another fluid, as described above.

The desired pressure is established in the waiting syringe preferably by triggering the discharge stroke of its piston a few moments before commutation. For this purpose a motor with two speeds in opposite directions is preferably used, so mounted that the higher speed corresponds to the filling phase of the piston; other devices which allow the same results to be achieved include adjustable speed motors and motors with a speed variator and/or reversal device.

The invention comprises also a device for controlling the various units described above so as to allow the whole process to be operated automatically.

This device comprises means for controlling the motors, the commutation device and the means for establishing the desired pressure in the waiting syringe while it is connected to the feed channel. For the preferred method in which the desired pressure is established in the waiting syringe by triggering the discharge stroke of its piston a few moments before the commutation, the said control means comprise at least one device for detecting the pressure in the waiting syringe. This is advantageously a constant pressure device which triggers a signal for initiating the commutation when the pressure in the syringe reaches the desired value. The detection device which is preferably arranged in the system between the syringe and the source is adjuvant, especially in the main feed channel so that only one constant pressure device need be used regardless of the number of syringes.

The means for controlling the various units of the device can be electrical, pneumatic, hydraulic or of any other type which makes it possible to automate the device. It is also possible to use control means which allow for manual intervention or partial manual operation, and this can be valuable, for example, when working in a laboratory.

Figure 2:
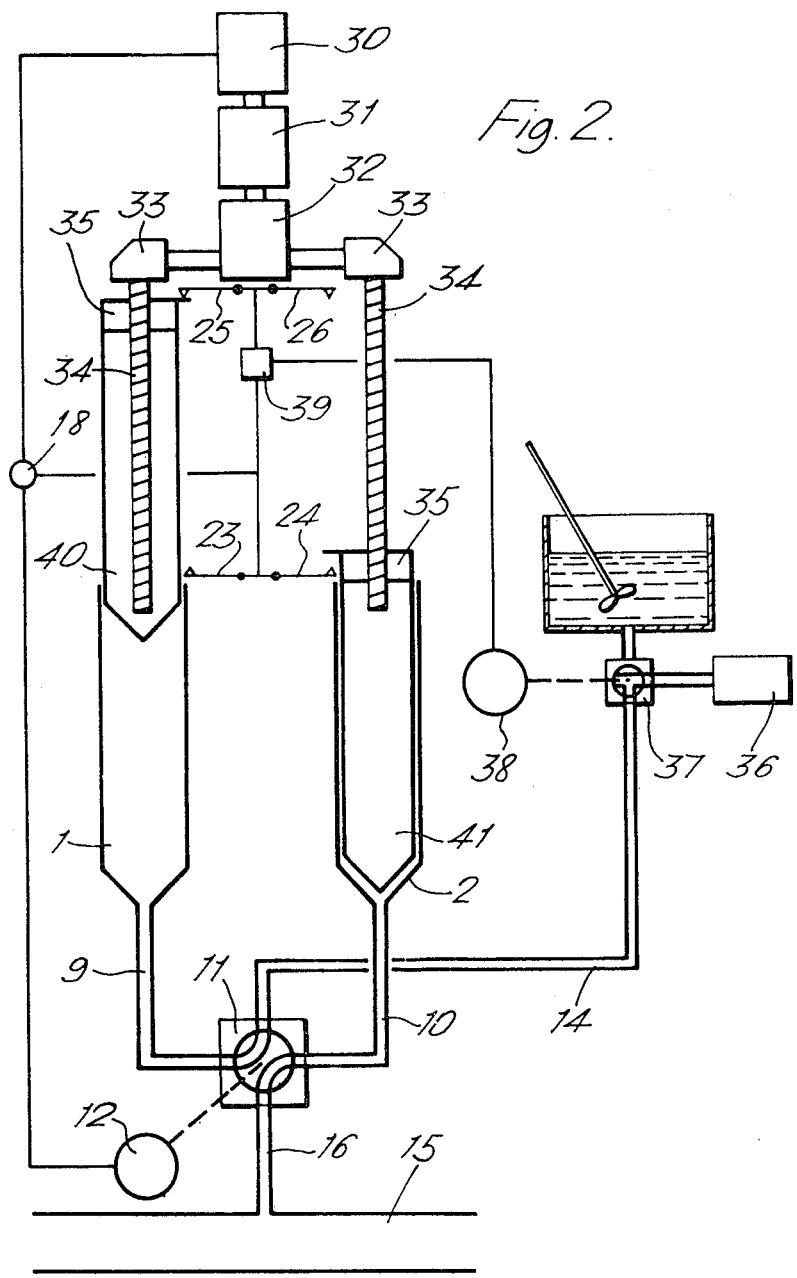

Devices according to the invention are illustrated in the accompanying drawing, in which FIG. 1 illustrates diagrammatically an injector having separate operating means for each piston, and FIG. 2 illustrates diagrammatically a generally similar injector having a single piston-operating means.

In the two figures like integers have the same reference numerals. Referring now to FIG. 1, the injector comprises two syringes 1 and 2 respectively provided with pistons 3, 4 of circular cross-sectional area 22.89 cm$^2$.

The pistons have threaded shafts 5, 6 and are reciprocated by screw transmission over a stroke of 27 cm. by electric motors 7, a having two speeds in opposite directions. A speed variator and a reduction device coupled to the motor make it possible to obtain a range of piston advance speeds from 2.5 to 25 mm./minute, allowing an hourly flow of adjuvant of 340 to 3,400 cm.$^3$/hour.

Each syringe and its piston are made of stainless steel. The play between the piston and the syringe wall is 0.5 mm. and the seal is provided by two polytetrafluorethylene ring gaskets mounted in grooves in the piston.

The injection orifices of the syringes are connected by pipelines 9, 10 to different tubes in the barrel of a rotating tap 11 with four outlets, the operation of which is controlled by a pneumatic jack 12. The other two tubes of the barrel are connected at one end to an adjuvant reservoir 13 through the feed channel 14, and at the other end to the main fluid pipeline 15 through the injection channel 16.

A constant pressure device 17 is arranged between the tap 11 and the reservoir 13 on the feed pipeline, and is connected to a relay 18 which controls the pneumatic jack 12 and affects the commutation when the pressure which it detects reaches the desired level.

The motors of the syringes 1 and 2 are controlled by the relays 19 and 20 respectively, which control the course of the filling stroke or "rise" of the pistons, and by the relays 21 and 22 which control the discharge stroke or "descent" of the pistons.

Contacts 23 and 24 triggered by the pistons during their descent are connected to the relays 22 and 21 respectively and the contacts 25 and 26 at the end of the rise are connected to the relays 19 and 20 respectively, relays 19 and 20 also being connected to the relay 28 which controls the valve 27, at the outlet from the reservoir 13.

The relay 18 is also connected by means of a two-position relay 29 to the relays 21 and 22 and to the relays 19 and 20, so that the actuation of the relay 18 triggers the alternate stopping and rise of the two pistons.

In operation, the piston 4, before reaching the end of its descent, triggers the start of the descent of the piston 3 by means of the contact 24. The valve 27 being closed, the pressure rises in the syringe 1 and in the pipelines 9 and 14. The constant pressure device 17 is adjusted to a detection threshold which is such that when the injection pressure is reached in syringe 1, it triggers the commutation by means of the relay 18 which controls the motor 12. The relay 18 also controls the stopping and rise of the piston 4 via the two-position relay 29 and the relay 20, which in turn controls the opening of the valve 27 by means of the relay 28. While commutation, which is practically instantaneous, occurs, the two pistons continue their descent at the same speed and no interruption or variation in pressure takes place in the injection of the adjuvant.

After the commutation the piston 4 rises and the syringe 2 fills with adjuvant. At the end of the rising stroke of the piston 4 the contact 26 trips the relay 20, stopping the motor of the syringe 2 and causing the valve 27 to close. A similar process takes place when the piston 3 reaches the height at which the contact 23 is triggered, and a new automatic operating cycle restarts when the piston 4 triggers the contact 24.

The process and apparatus described permit the automatic and continuous injection of adjuvant at a strictly constant rate which can have any desired value within the range indicated above. This rate can if desired, be varied during the injection by changing the variator adjustment either manually or by linking the latter to a variable parameter such as for example the fluid flow rate. The range of adjuvant flow rate can also be varied as desired by varying the transmission ratios and/or the speed variation, or by choosing syringes of larger or smaller volume, so that the application of the invention extends to practically any desired flow rate.

The injector illustrated in FIG. 2 is generally similar but comprises, instead of a motor for each syringe, a common reversible motor 30 driving a speed variator 31 and a box 32 with two output shafts by means of which the pistons 40 and 41 can be moved simultaneously and in opposite directions by means of bevel gears 33, racks 34 and screws 35.

This injector comprises also a device for injecting nitrogen or another inert fluid under a pressure slightly above the injection pressure (to compensate for pressure losses) arranged in the adjuvant feedline 14. It comprises a nitrogen feed 36 at the desired pressure and a rotating tap 37 with three outlets which allows the channel 14 to be fed either with adjuvant or with nitrogen. The tap is controlled by motor 38.

The contacts 25 and 26 control the nitrogen inlet by means of the tap 37 when they are triggered by the corresponding piston. The contacts 23 and 24 control, by means of the relay 18, the commutation and the reversal of direction of the motor 30, and by means of the relay 39 the admission of adjuvant through the tap 37.

The contacts 25 and 26 are located 0.5 mm. from the extreme point of the filling stroke of the pistons. Thus, during the end of the filling, a volume of 0.05×22.89, say about 1 cm.³, of nitrogen is introduced into the injection device whenever a syringe fills. Since the useful volume of a syringe is about 600 cm.³ the relative error introduced by injecting nitrogen is 1/600. This can be reduced by suitably choosing the position of the contacts 25 and 26 or the volume of the syringes.

In operation, when the piston 40 arrives close to the end of its filling stroke the contact 25 triggers the admission of nitrogen which compresses the adjuvant in the syringe 1. FIG. 2 shows the position which the various units of the device then occupy. When the piston 40 arrives at the end of the filling stroke the piston 41 arrives at the end of the injection stroke and triggers the contact 24. This triggers the operation of the tap 37 by means of the relay 39, closing the nitrogen inlet and opening the adjuvant inlet, and triggers the operation of the tap 11 and the direction reversal of the motor 30 by means of the relay 18. The syringe 1 is then in the injection phase and the syringe 2 in the filling phase, at the end of which the piston 41 triggering the relay 26, followed by the piston 40 triggering the relay 23, starts a similar process of permutation of the syringes, and when the piston 40 again arrives near the end of its filling stroke the cycle described above restarts.

The following examples illustrate the invention.

EXAMPLE 1

In this example the injector of FIG. 1 is used.

An aqueous suspension of titanium dioxide is injected into a solution of polyhexamethylene adipamide salt (hexamethylene diammonium adipate) undergoing polymerization and circulating continuously in the pipeline at a temperature of about 235° C. and under a pressure of 300 p.s.i. The various control devices are therefore set so that the injecting stroke of each piston is delayed until the same pressure exists in the corresponding syringe. This effectively prevents entry of the salt into the injection channel and consequent blockage thereof. On the other hand the rate of flow of titanium dioxide suspension is constant, and a uniform distribution of the titanium dioxide and as a result a uniform matting effect of the polymer eventually formed, is obtained.

EXAMPLE 2

The same process is repeated with the injector of FIG. 2, using a nitrogen pressure of 300 p.s.i. Again a uniformly matted polymer is obtained.

The invention thus makes possible a carefully controlled injection of one fluid into another in the sense defined above, regardless of the pressure and temperature conditions of the fluids in question. It has the advantage that the injection is carried out continuously and automatically at the desired rate, which can be constant or vary as a function of a variable parameter, which is caused to control the speed of operation of the injector. It furthermore permits very high precision in the flow rate of the injected fluid at all times, which makes it particularly valuable in the case of low flow rates.

All this is done without using devices such as flap valves or needle end valves which are liable to rapid wear, so that the process can be carried out with great reliability even when injecting abrasive fluids.

We claim:

1. A process for the accurately controlled continuous injection of minor amounts of an adjuvant into a stream of a fiber-forming high polymer spinning composition, which comprises injecting the adjuvant into the said stream by means of a plurality of syringes, causing at any one time at least one of said syringes to feed adjuvant to the stream, operating the individual syringes in alternating filling and discharge phases, and establishing in each syringe at the end of the filling phase and before the discharge phase begins a pressure at least equal to the pressure existing in the zone occupied by the said stream.

2. Process according to claim 1 wherein the discharge phases of two syringes overlap.

3. Process according to claim 1 wherein the said pressure in a syringe before injection therefrom begins is generated by a downward movement of the piston.

4. Process according to claim 3, wherein two syringes are used, with filling phases shorter than their discharge phases, and the two discharge phases overlap.

5. Process according to claim 4, wherein two syringes are used, with filling phases shorter than their discharge phases, and the two discharge phases overlap.

6. Process according to claim 1, wherein the said pressure in a syringe before injection therefrom beings is generated by means of a compressed inert fluid.

7. Process according to claim 1, wherein two syringes are used, and their filling phase lasts for a shorter time than their discharge phase.

8. Process according to claim 1, wherein a suspension of a matting agent is injected into the said stream.

9. A device for the accurately controlled continuous injection of minor amounts of an adjuvant into a stream of a high fiber-forming polymer spinning composition, which comprises a passageway adapted for continuous passage of aid stream, a plurality of syringes, motor means whereby the pistons of the syringes can be reciprocated, a commutation device whereby the orifice of each syringe can be connected alternately to the said passageway and to a source of the adjuvant, means for establishing in each syringe a pressure at least equal to that in the said passageway, and control means whereby the reciprocation of the pistons, and the operation of the said connecting means and pressure-establishing means are so correlated that at any one time at least one syringe is discharging adjuvant into the said passageway, and that before such discharge beings the said pressure is established in that syringe.

10. A device according to claim 9, wherein the control means is adapted to cause the desired pressure to be established in a particular syringe after the filling stroke of its piston has been completed.

11. A device according to claim 10, wherein the control means is adapted to cause the discharge stroke of the piston to begin before the commutation device opens a connection between the syringe and the chamber, the said connection being opened only when the pressure in the syringe is at least as high as that in the chamber.

12. A device according to claim 11, wherein the piston of each syringe is controlled by a two-speed motor, with the higher speed being used in the filling phase, and the control device comprises at least one constant pressure device arranged in the system between the syringe and the source of adjuvant and connected to a relay controlling the commutation device and the reversal of the stroke of the piston, a device for triggering the discharge phase of a piston as a function of a position close to the end of the discharge stroke of another piston, and a device for stopping the piston at the end of the filling stroke.

13. A device according to claim 12, wherein the piston of each syringe is controlled by a two-speed motor, with the higher speed being used in the filling phase, and the control device comprises at least one constant pressure device arranged in the system between the syringe and the source of adjuvant and connected to a relay controlling the commutation device and the reversal of the stroke of the piston, a device for triggering the discharge phase of a piston as a function of a position close to the end of the discharge stroke of another piston, and a device for stopping the piston at the end of the filling stroke.

14. A device according to claim 9, which comprises as a means of generating the required pressure a source of inert fluid under pressure, and means for transmitting the pressure thereof to the interior of a syringe before it beings to inject.

15. A device according to claim 9, wherein the piston of each syringe is controlled by a two-speed motor, with the higher speed being used in the filling phase, and the control device comprises at least one constant pressure device arranged in the system between the syringe and the source of adjuvant and connected to a relay controlling the commutation device and the reversal of the stroke of the piston, a device for triggering the discharge phase of a piston as a function of a position close to the end of the discharge stroke of another piston, and a device for stopping the piston at the end of the filling stroke.